April 19, 1955
J. M. HAIT
2,706,596
AIR BLAST DIVERTER FOR AGRICULTURAL
SPRAYING AND DUSTING MACHINES
Filed Dec. 11, 1950
6 Sheets-Sheet 1
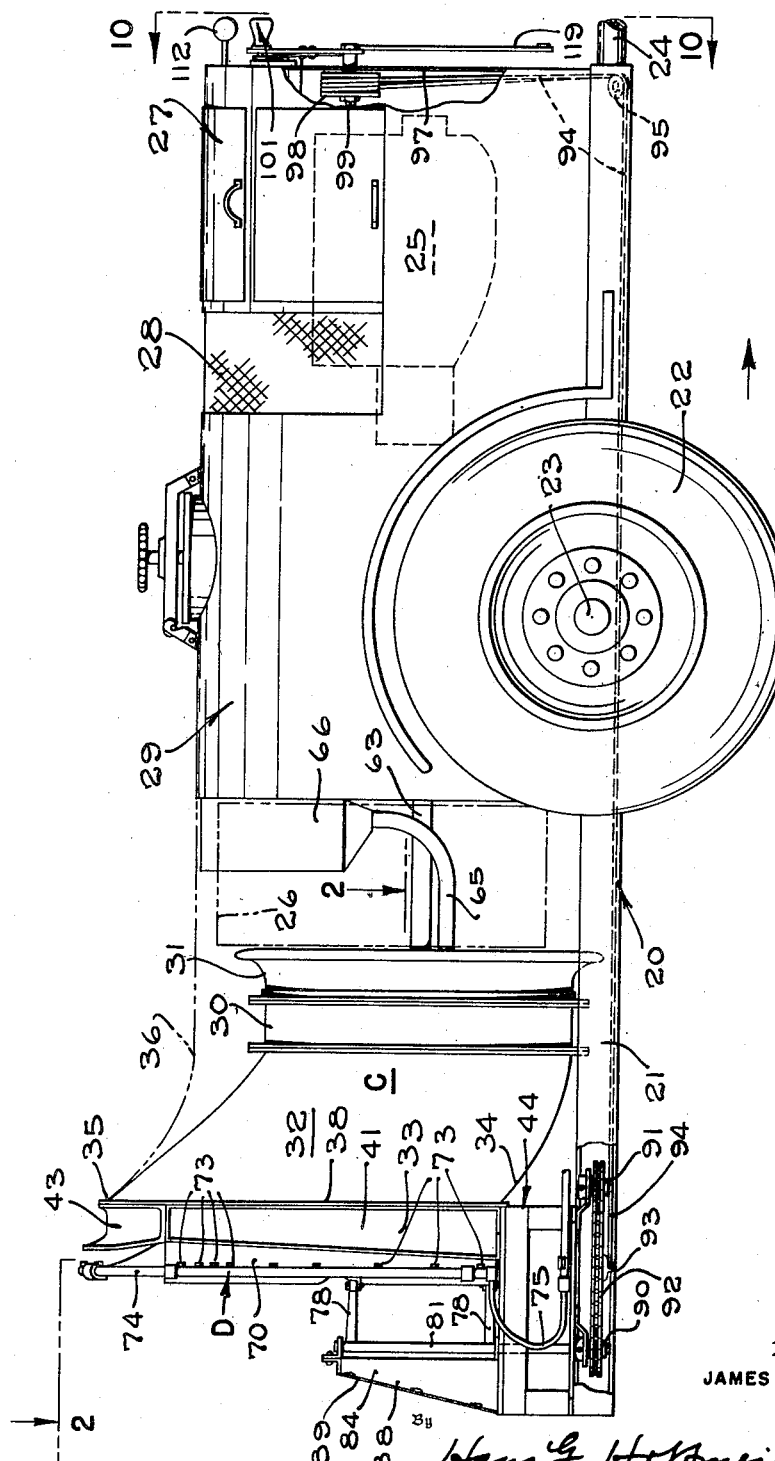
FIG_1
Inventor
JAMES M. HAIT
By Hans G. Hoffmeister
Attorney April 19, 1955
J. M. HAIT
2,706,596
AIR BLAST DIVERTER FOR AGRICULTURAL
SPRAYING AND DUSTING MACHINES
Filed Dec. 11, 1950
6 Sheets-Sheet 2
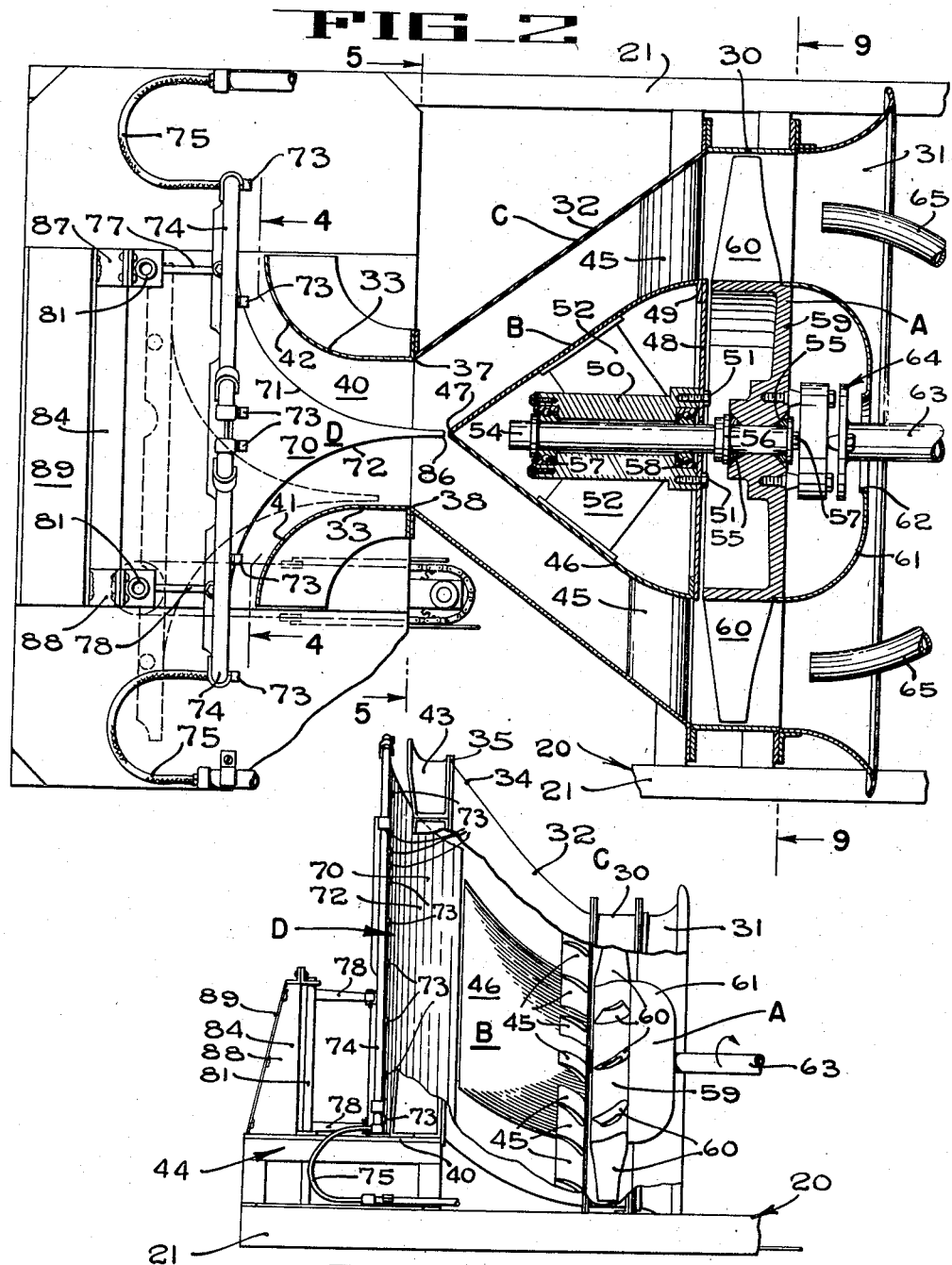
Inventor
JAMES M. HAIT
By Hans G. Hoffmeister
Attorney

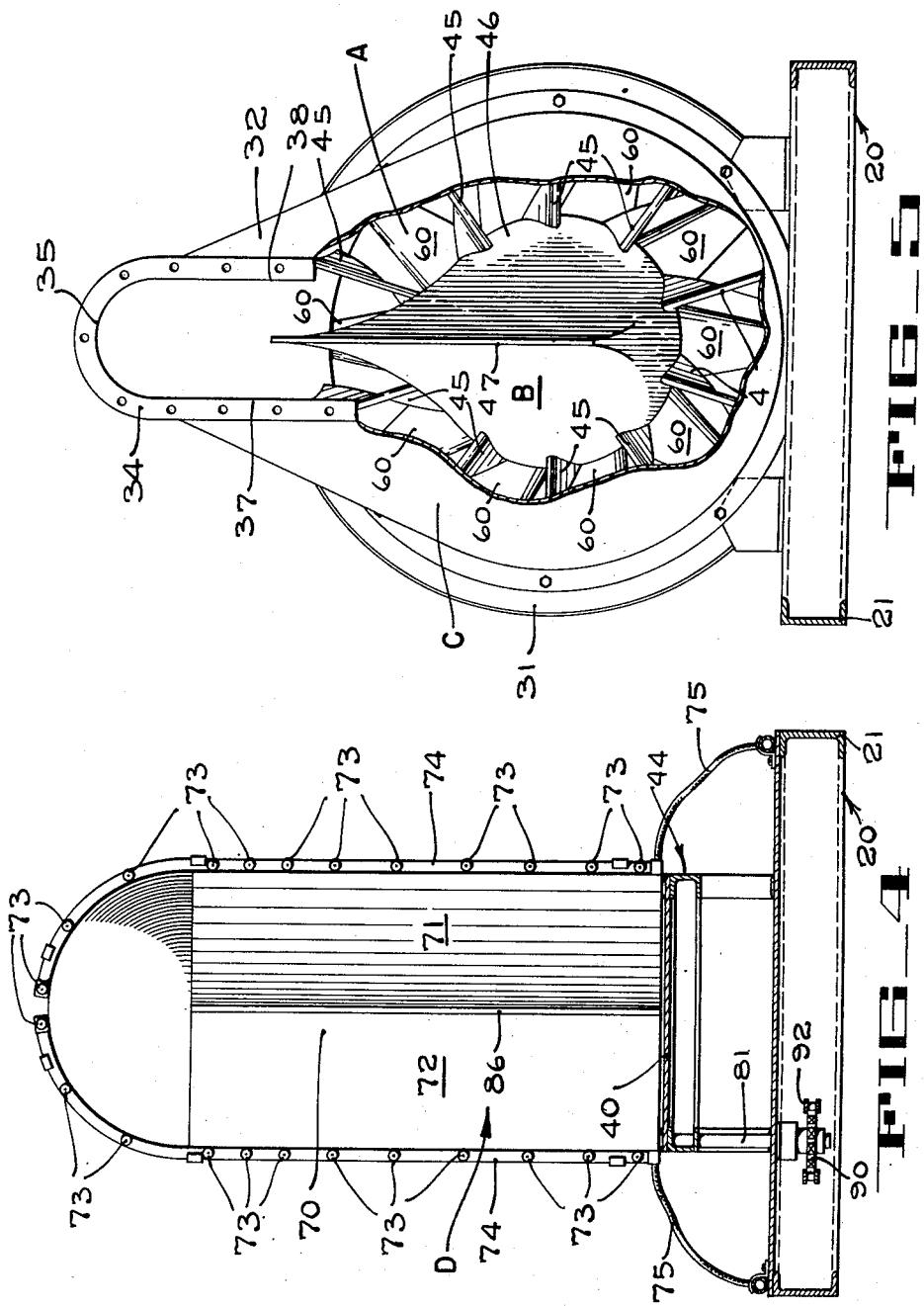

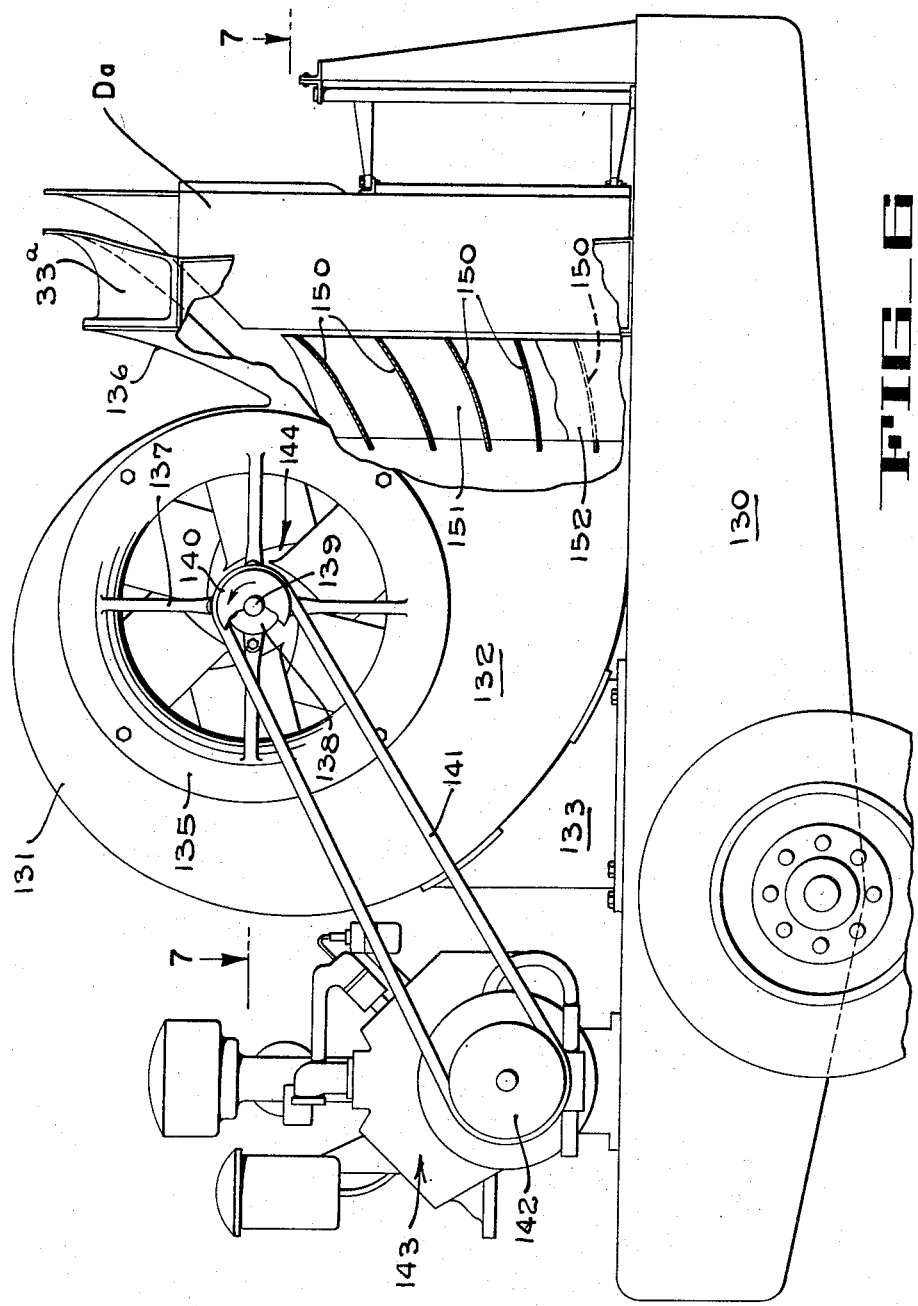

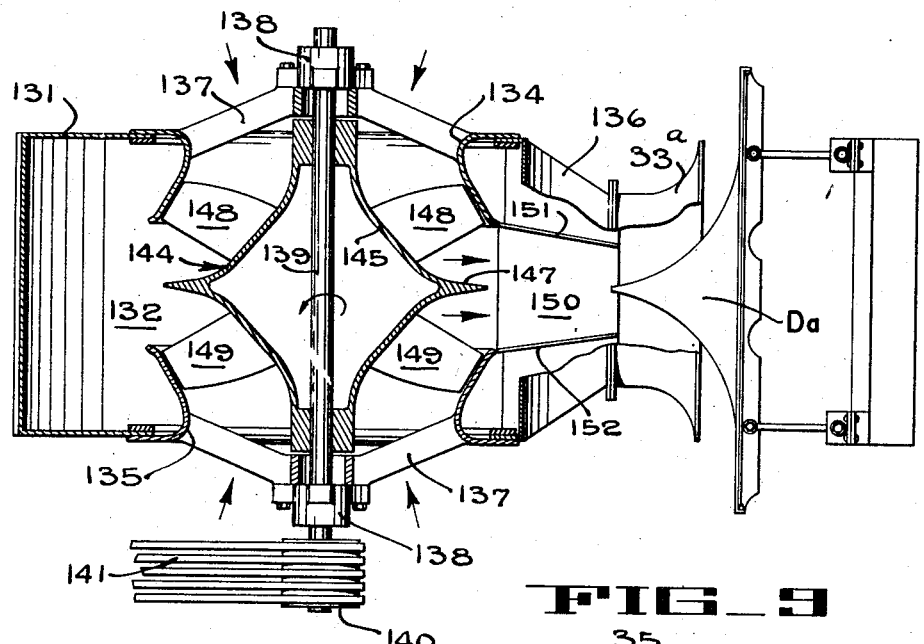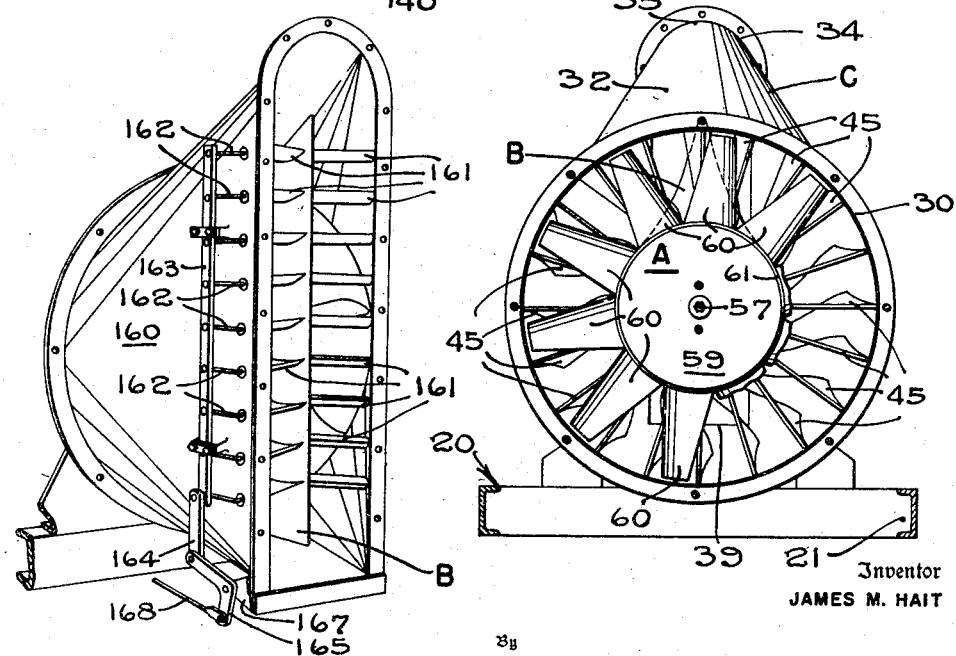

April 19, 1955      J. M. HAIT      2,706,596
AIR BLAST DIVERTER FOR AGRICULTURAL
SPRAYING AND DUSTING MACHINES
Filed Dec. 11, 1950      6 Sheets-Sheet 6
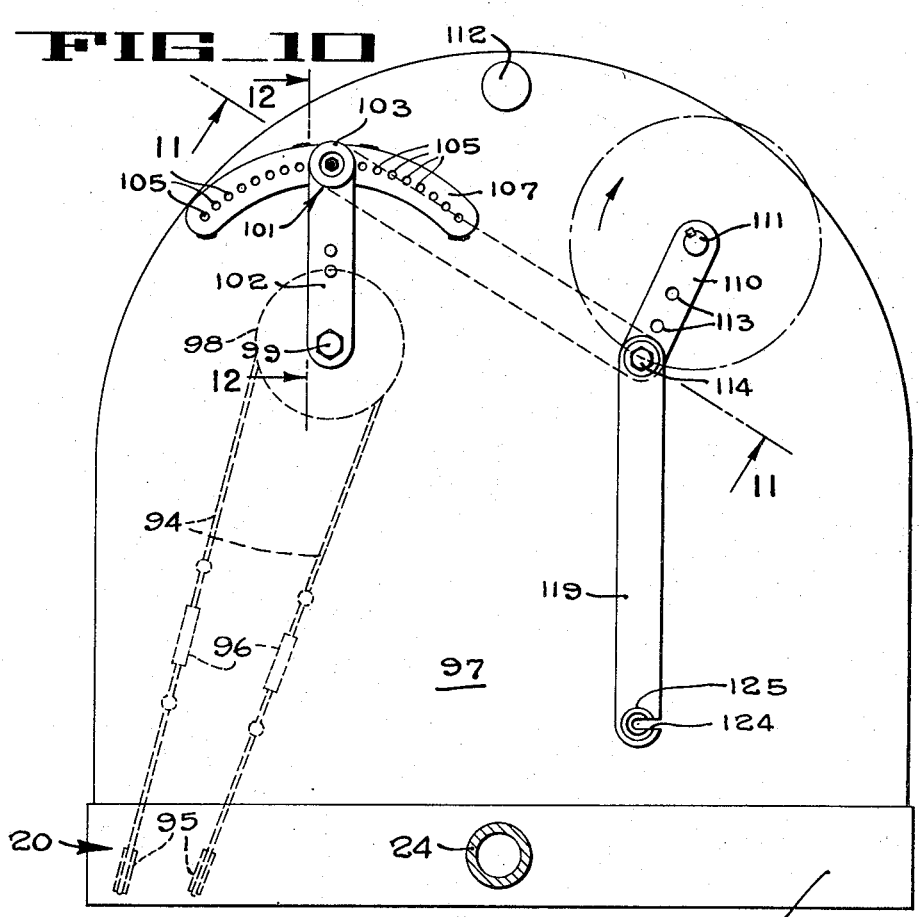
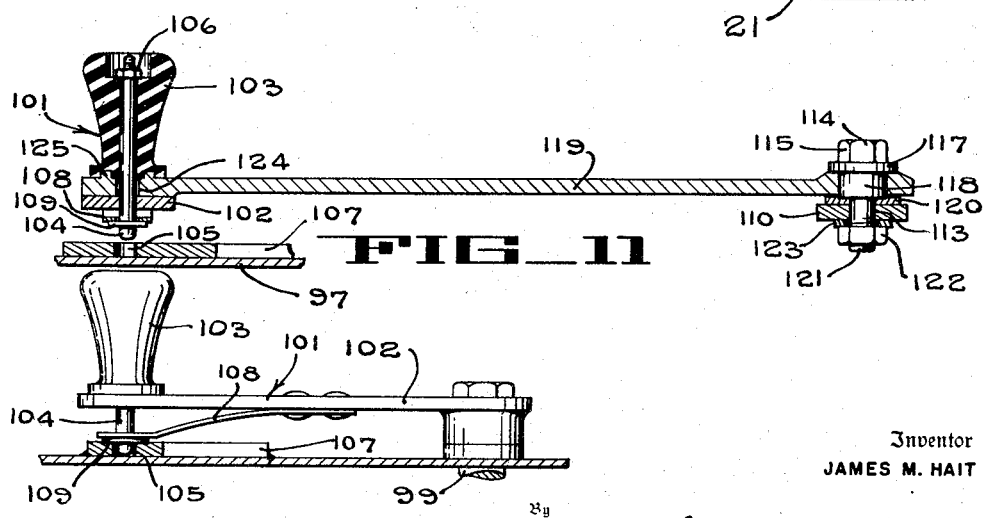
Inventor
JAMES M. HAIT
Attorney United States Patent Office 2,706,596
Patented Apr. 19, 1955

2,706,596

AIR BLAST DIVERTER FOR AGRICULTURAL SPRAYING AND DUSTING MACHINES

James M. Hait, San Jose, Calif., assignor to Food Machinery and Chemical Corporation, San Jose, Calif., a corporation of Delaware Application December 11, 1950, Serial No. 200,245

18 Claims. (Cl. 230—114)

This invention relates to an agricultural and horticultural spraying and dusting machine, and is directed more particularly to a spraying and dusting mechanism having a shiftable head structure for forming and controlling a spray or dust laden air blast discharged by the mechanism.

An object of the present invention is to provide an improved air blast forming and directing device for an agricultural spraying and dusting machine.

Another object is to provide a spraying and dusting machine with an air blast creating mechanism having a laterally shiftable head, whereby the entire air blast can be directed selectively toward one side or the other, or may be divided, with varying portions thereof directed simultaneously toward both sides of the machine.

Another object is to provide the discharge end of an air blast creating mechanism with means for selectively dividing and directing an air blast discharged by said mechanism.

Another object is to change an initially ring-shaped blast of air to one of vertically elongated shape, and then to divert said elongated air blast or selected portions thereof through passages which may be varied in size and shape while maintaining a smooth aerodynamic flow of the selected portions of the air blast therethrough.

Another object is to form an air blast of circular or regular polygonal cross sectional shape into vertically elongated cross sectional shape and then to divert the blast thus formed or selected portions thereof, laterally either to one side or the other.

Another object is gradually, and without substantial interference with its aerodynamic flow characteristics, to change the shape of an air blast created by an axial flow fan from ring-like to vertically elongated shape.

Another object is to divided and divert selected portions of an air blast discharged by an air blast creating and forming mechanism by means of an angularly positioned diverging surface mounted adjacent the discharge end of the mechanism without changing the angular position of the diverging surface.

These and other objects and advantages of the invention will become apparent from the following description and the accompanying drawings, wherein:

Fig. 1 is a side elevation of a spraying mechanism embodying the present invention, portions thereof being broken away.

Fig. 2 is an enlarged fragmentary horizontal section taken along line 2—2 of Fig. 1.

Fig. 3 is a side elevation of the rear or left hand portion of Fig. 1, parts thereof being broken away.

Fig. 4 is a section taken along the line 4—4 of Fig. 2.

Fig. 5 is a section taken along line 5—5 of Fig. 2, portions of a tapered transition casing section being broken away.

Fig. 6 is a side elevation of a modified form of the invention employing a mixed flow blower instead of the axial flow blower illustrated in the preceding views of the drawings.

Fig. 7 is a fragmentary section taken along line 7—7 of Fig. 6, portions thereof being broken away.

Fig. 8 is a perspective rear view of a tapered casing section modified somewhat from that of Figs. 1 to 5, inclusive, and having a plurality of pivotally adjustable air deflecting vanes mounted in the downstream end thereof.

Fig. 9 is a section taken along line 9—9 of Fig. 2, portions of the propeller blades being broken away to show the air straightening vanes.

Fig. 10 is an enlarged section taken along line 10—10 of Fig. 1, a power drive link being shown in solid lines in inoperative position and in dotted lines in operative position.

Fig. 11 is a further enlarged fragmentary section taken along line 11—11 of Fig. 10 as it would appear with the drive link in operative position.

Fig. 12 is an enlarged section taken along line 12—12 of Fig. 10.

In order to facilitate an understanding of the invention an entire spraying mechanism is described briefly herein together with means for introducing dust and spray forming material into the air stream discharged therefrom. However, it will be obvious to one familiar with the art that any suitable mechanism capable of generating and discharging an air blast of adequate size and velocity with means for introducing finely divided material into the air blast for air borne conveyance thereby will be suitable for practicing the invention. As used herein therefore such terms as "spraying and dusting mechanism" are intended to mean any such suitable mechanism.

In the embodiment of the invention shown in Figs. 1 to 5, inclusive, a trailer chassis 20 has a conventional channel steel frame 21, with supporting wheels 22 journaled on an axle 23. A towing tongue 24 is provided for attaching the device to a truck or tractor in the usual manner for such mechanisms.

An internal combustion engine 25, shown in dotted lines in Fig. 1, is mounted in a compartment 27 at the forward end of the trailer chassis, and a screened opening 28 is provided in the wall of the engine compartment to admit cooling and combustion air thereto. A spray material tank 29 is mounted on the chassis, preferably over the axle 23 so that variations in the amount of spraying liquid in the tank will not materially change the center of gravity of the trailer.

In the form of the invention illustrated in Figs. 1 to 5, inclusive, and Fig. 9 the air blast creating and forming mechanism comprises a power driven propeller A (Figs. 2, 3, 5 and 9), a tapered core B, a duct or casing C (Figs. 1, 2 and 3) and a shiftable deflector head D (Figs. 1, 2, 3 and 4).

The casing C has a generally cylindrical propeller section 30, a flared, annular air intake cowling 31, a tapered air blast transforming section 32 and an outwardly flaring discharge section 33. A sheet metal enclosure, indicated by the broken line 36 in Fig. 1, may be provided to enclose the casing C, the cross sectional shape of the enclosure 36 conforming generally to that of the tank 29. A screened opening 26 is provided in each side of the enclosure 36 to admit air to the intake end of the casing C.

The cylindrical propeller casing section 30 is mounted on the trailer chassis 20 (Figs. 2 and 3), and the flared, annular inlet cowling 31 is secured to the inlet end of the propeller casing section 30 so that the inner walls of both are co-extensive at their line of juncture. The tapered air blast transforming casing section 32, which preferably (Figs. 1 and 3) is up-swept at its downstream end 34, is secured at its upstream end to the downstream end of the propeller casing section 30. The forward or upstream end of the tapered air blast transforming casing section 32 is circular in cross section, and its inner surface also is co-extensive with that of the propeller casing section 30 at their line of juncture.

The tapered transforming casing section 32 changes from circular cross sectional shape (Fig. 5) at its upstream end where it joints the propeller casing section 30, to a laterally reduced and vertically elongated shape at its downstream end 34. The downstream end 34 of the tapered transforming casing section 32 has an arched upper edge 35 (Figs. 3, 5 and 9), straight, upright side edges 37 and 38, and a straight, horizontal lower edge 39 (Fig. 9).

The outwardly flared discharge casing section 33 (Figs. 1, 2 and 3) has a substantially flat horizontal bottom 40, outwardly flaring side walls 41 and 42 and an arched, upwardly flaring upper wall 43. The upstream end of the discharge casing section 33 is shaped to conform to the downstream end 34 of the tapered transforming casing section 32, the inner walls of the two casing sections being coextensive at their line of juncture. A low platform 44 (Fig. 3), mounted on the rear of the chassis bed, supports the upswept rear end of the tapered casing section 32, and the flat bottom 40 of the discharge casing section 33 is secured thereto.

The tapered core B (Figs. 2, 3 and 5) has a body portion 46 (Fig. 2) mounted within the tapered casing section 32, being supported therein by a plurality of air straightening vanes 45 which are secured at their radially inner ends to the core body 46, and at their outer ends within the generally circular upstream portion of the tapered casing section 32. The core body member 46 is circular in cross section at its upstream end, and tapers toward its downstream end, changing gradually from its circular cross sectional shape at its upstream end to an upswept, straight, vertical blast dividing trailing edge 47 (Figs. 2, 3 and 5) at its downstream end. The change in shape and size of the core body 46 conforms substantially to that of its associated transforming casing section 32, although preferably the cross sectional area of the space between these two members decreases gradually toward their downstream ends to prevent loss of velocity of the air blast flowing therethrough.

A head disk 48 (Fig. 2) of a diameter conforming to that of the round upstream end of the core body member 46, is secured to an inwardly extending flange 49 on the core body member 46. A tubular bearing support member 50 is secured by screws 51 to the rear face of the disk 48 with the axial bore of the bearing support member 50 normal to the plane of the disk 48, and centered in a central opening in the disk. Arms 52 extend radially outward from the bearing support member 50, their outer ends being secured to the wall of the core body member 46 to brace the bearing support member 50 to the core.

The axial flow type of fan wheel or propeller A is secured to a shaft 54 journaled in ball bearings 57 and 58 mounted in the bore of the bearing support member 50, the bearings being of a type to resist the axial thrust imparted to the propeller shaft 54 upon rotation of the propeller. The propeller has an imperforate hub portion 59 of substantially the same diameter as the forward end of the tapered core B and is concentric therewith. The central bore through the hub of the propeller has conically beveled end surfaces (Fig. 2) in which split centering rings 55 are inserted. The centering ring on the inner end of the bore bears against a collar 56 secured to the shaft, while the outer ring is forced inwardly against its conical seat by a washer and cap screw 57 screwed into a threaded hole in the end of the propeller shaft 54 to bring the propeller into co-axial alignment with its supporting shaft 54. Radially extending propeller blades 60 are provided on the hub 59 and terminate closely adjacent the propeller casing section 30.

A domed spinner 61 of a size to fit over the imperforate propeller hub 59 is secured on the upstream end of the hub, a central opening 62 being provided in the spinner to receive a drive shaft 63, which is driven in any suitable manner from the engine 25 (Fig. 1). The type of driving connection employed between the engine and fan comprises no part of the present invention, but it may consist, for example, of the drive shaft 63 connected to the propeller shaft 54 by a flexible coupling 64, the drive shaft extending lengthwise through the tank 29, and being sealed to the tank by conventional stuffing boxes, not shown, mounted in the heads of the tank. Other suitable driving connections will, of course, be obvious to those familiar with the art.

The flared annular inlet cowling 31, and the spinner 61, guide the air drawn in by rotation of the propeller 60 into the annular space between the propeller hub 59 and the propeller casing section 30. Insecticidal or other dust may be introduced into the air stream in any desired manner, for example, through ducts 65 (Figs. 1 and 2) which may be connected to the dust feed outlet from a conventional type of dust hopper 66 (Fig. 1).

The laterally shiftable air blast dividing and deflecting head D has a body portion 70 of generally V-shaped cross section (Figs. 1, 2, 3 and 4), mounted with its apex directed into the outwardly flared discharge section 33 of the casing C. The side faces 71 and 72 of this laterally shiftable V-shaped head are concavely curved to correspond generally with the curvature of the inner surfaces of the outwardly flaring side walls 41 and 42 of the casing discharge section 33 opposite thereto.

The curved air deflecting side surfaces 71 and 72 of the shiftable head D are spaced from the correspondingly curved side walls 41 and 42 of the flared discharge casing section 33 so as to continue the gradual reduction in cross sectional area of the space through which the air blast flows after leaving the propeller. Thus the air blast will continue to be reduced gradually in cross sectional area from the time it leaves the fan wheel A until it is discharged from the space between the outwardly flaring walls of the discharge section 33 and the correspondingly curved deflecting side surfaces of the laterally shiftable head D.

Liquid spray material may be fed to the air blasts in any suitable manner, for example, by spray nozzles 73 (Figs. 1, 2 and 3) screwed into threaded openings provided therefor in pipes 74 mounted to conform to the side edges of the dividing head D. Spray liquid from the tank 29 is supplied under pressure to the pipes 74 and thence to the nozzles 73 by a conventional liquid pump, not shown, through flexible hydraulic hoses 75.

The shiftable deflector head D is mounted for combined lateral and fore-and-aft swinging adjustment on two vertically aligned pairs of parallel arms 77 and 78 (Figs. 2 and 3). Each pair of head support arms 77 and 78 is secured to an upright mounting shaft 81 which is pivoted on a supporting frame 84. The supporting frame 84 is mounted on the chassis platform 44 and comprises a pair of upright end standards 87 and 88 secured together by a transverse bracing plate 89 welded across the rear sides thereof. The radial length of the head supporting arms 77 and 78 is such as to move the head D rearwardly a distance proportional to its lateral movement on a pivotal movement of the arms so as to maintain proper spacing from the flaring walls of the discharge section 33, during lateral adjustment of the deflecting head D. In its centered position as shown in solid lines in Fig. 2 the apex edge 86 formed by the intersection of the deflecting side faces 71 and 72 of the head D is aligned with and closely adjacent to the vertical trailing edge 47 of the core member B, so as to define a pair of laterally diverging air passages. As the head is shifted to one side or the other from this centered position, the width, and therefore the cross sectional areas, of the two laterally diverging passages between the opposite sides of the head D and the sides of the downstream end of the duct or casing C will be varied inversely.

A head adjusting drive sprocket 90 is secured to the lower end of one of the arm supporting shafts 81 (Figs. 1 and 2) and an idler sprocket 91 is journaled on the under side of the chassis frame 21 forwardly of the sprocket 90. A drive chain 92 passes around the sprockets 90 and 91, and a pair of lugs 93 are secured to opposite sides of the straight runs of the chain midway between the sprockets. A pair of flexible control cables 94 are connected one to each of the lugs 93, and extend forwardly therefrom. The cables are passed around pulleys 95 (Figs. 1 and 10) secured to the chassis frame near the forward end thereof, and thence are carried upwardly inside the front wall 97 of the engine compartment 27. Conventional turnbuckles 96 are provided in the cables to permit adjustment and tightening thereof. The two cables are wrapped in opposite directions around a winch drum 98 (Figs. 1 and 12) secured to a short shaft 99 journaled in the forward wall of the engine compartment.

A control handle 101 (Figs. 1, 10, 11 and 12) is secured to the drum shaft 99 and comprises a lever arm 102 provided with a manual grip member 103. A locking pin 104 (Figs. 10, 11 and 12) has a light press fit in an axial hole through the hand grip member 103 and is slidably inserted in a hole in the lever arm 102. A nut 106 is screwed onto the reduced threaded outer end of the locking pin 104 to limit axial inward displacement of the pin in the hand grip member. The rounded inner end of the locking pin 104 is adapted to enter a selected hole of a plurality 105 thereof (Fig. 10) in a conventional quadrant 107 mounted on the front side of the forward wall 97 of the engine compartment.

A leaf spring 108 (Figs. 11 and 12) secured to the under side of the lever arm 102 has a forked free end which spans the locking pin 104 and bears against a flange 109 secured to the locking pin, to urge the pin and the hand grip member inwardly. By pulling out on the hand grip member 103 to withdraw the pin from its hole in the quadrant 107 and then swinging the control handle 101, the winch drum 98 may be rotated to a desired adjusted position and locked in such position by releasing the hand grip 103 to allow the spring 108 to urge the locking pin 104 into a selected one of the holes 105 in the quadrant. The cables 94 and the chain 92 transmit the rotative movement of the winch drum 98 to the sprockets 90 and 91 and thence to the arm supporting shaft 81 to control the lateral shifting of the dividing head D carried by the arms 77 and 78.

By shifting the dividing head D laterally to one limit of its movement as indicated in dotted lines in Fig. 2, the passage between the head D and the outwardly flared side wall 41 of the casing discharge section 33 (Fig. 2) will be virtually closed. However, the passage between the head D and the opposite flared side wall 42 of the discharge casing section 33 will then extend substantially the entire width of the outlet end 34 of the tapered transforming section 32, so that substantially the entire volume of the air blast from the propeller A will thus be turned and directed through the space between the head D and the flaring side wall 42.

It is obvious that an opposite rotative adjustment of the control handle 101 will swing the shiftable head D toward an oppositely adjusted position, while in intermediate adjusted positions of the divider head D the portions of the blast directed toward the two sides thereof will be determined by the adjusted position of the head D.

The head D may be secured in any of its adjusted positions by the locking pin 104 and quadrant 107. Adjustment of the head D can be made by the operator while the machine is running so that constant control of the blast is provided to allow the operator to compensate for wind variations, differences in tree sizes, and other variables.

The leaves of some densely foliaged trees, for example orange trees, have a tendency to overlap under the action of a continuous air blast, like the closing of a Venetian blind, so that after an initial portion of a continuous high velocity air stream enters the interior of the foliage mass, a major portion of the following portion of the blast will be deflected by this louver-like action of the leaves. In order to create pulsations in the air blast so as to allow the leaves to resume their normal open position between intermittent puffs of such a pulsating blast, power drive means may be provided to oscillate the shiftable head D from side to side in recurring cycles.

A simple but effective mechanism for thus mechanically shifting the dividing head D in such recurring cycles is shown in Figs. 1, 10, 11 and 12. A power driven arm 110 is keyed to a rotatable shaft 111 (Fig. 10) which is connected in a conventional manner, through suitable clutch controlled drive means, not shown, to a source of power such as the engine 25. Means for controlling the clutch controlled drive means, and thereby the rotation of the shaft 111, may consist of a usual push-pull type control handle 112 (Figs. 1 and 10). A plurality of pivot post mounting holes 113 are provided in the power driven arm 110, and a pivot post 114 (Figs. 10 and 11) is adapted to be mounted in a selected one of these holes to provide bearing support for one end of a connecting drive link 119.

The pivot post 114 shown in Fig. 11 has a hexagonal head 115 with a radially extending washer-like bearing flange 117 formed thereon. A round, bearing portion 118 is formed on the shank of the post 114, and a threaded terminal shank portion 121 of reduced diameter is adapted to fit closely into any one of the openings 113 in the power driven arm 110. A bearing washer 120 is provided to fit onto the reduced threaded shank portion 121 and to seat in the shoulder produced by the reduction in diameter of the threaded shank portion 121. A nut 122 and lock washer 123 secure the pivot post in a selected hole 113.

The other end of the actuating link 119 from that journaled on the pivot post 114 has a notch 124 extending laterally inward from one side edge thereof with a rounded inner end adapted to receive the locking pin 104 therein. An annular bead 125 (Figs. 10 and 11) is formed on the outer side of the actuating link 119 concentrically with the inner end of the notch 124, and this bead (Fig. 11) fits into a circular recess of corresponding cross sectional shape in the inner end of the hand grip member 103.

By pulling the hand grip member outwardly against the pressure of the leaf spring 108, dropping the notched end of the link 119 over the locking pin 104, and then releasing the hand grip member 103, the leaf spring 108 will draw the hand grip member inwardly to the position shown in Fig. 11, causing the retaining bead 125 to enter the groove therefor in the hand grip member. Thus the power driven arm 110 will be linked to the operating handle so that rotation of the arm supporting shaft 111 will cause the control handle 101 to oscillate back and forth across its quadrant, the amplitude of its swing being determined by the position of the pivot post 114 on the power driven lever arm 110. The interposition of the end of the link 119 between the hand grip member 103 and the lever arm 102 holds the locking pin 104 free of the quadrant during such power driven actuation of the control handle.

In the modified form of the invention shown in Figs. 6 and 7 the body of the trailer chassis consists of a wheel supported tank 130. A mixed flow blower of the double inlet type has a housing 131 supported on the tank body 130 by a pedestal 133. The blower housing consists of a usual volute housing portion 132, and an air blast transforming portion 136. The side walls of the transforming portion 136 taper inwardly toward the downstream end of the housing, while the top and bottom walls diverge in this same direction. The cross sectional area of the tapered discharge portion preferably decreases slightly toward its downstream end similarly to the transforming casing section 32 of the form of the invention shown in Figs. 1 to 5, inclusive, to avoid loss of velocity of the air blast passing therethrough. A pair of annular inlet shrouds 134 and 135 are secured in the eyes of the volute portion 132 of the blower housing, the cross sectional shape of these shrouds being shown clearly in Fig. 7. A spider 137 is provided in each of the shrouds 134 and 135 to support a rotor shaft bearing 138 centrally thereof.

A rotor support shaft 139 is journaled in the bearings 138 and a multiple grooved pulley 140 is secured to one end of the rotor shaft. Multiple V-belts 141 provide driving connection between the pulley 140 on the rotor shaft 139 and a similarly multiple grooved, but larger diameter, drive pulley 142, keyed to the crank shaft of an internal combustion engine 143 mounted on the trailer body 130 rearwardly of the blower housing 132.

An impeller or fan wheel 144 of a well known mixed flow type is secured to the fan shaft 139 to rotate therewith. The impeller has a hollow, double conical hub portion 145 (Fig. 7) with its side walls shaped to provide air inlet passages of proper aerodynamic shape between the sides of the hub 145 and the shrouds 134 and 135. An air deflecting flange 147 extends radially outwardly from the center of the double conical hub 145 and a plurality of fan blades 148 and 149 are mounted on opposite sides of the hub 145, their tips terminating closely adjacent the shrouds 134 and 135, respectively.

The two sets of fan blades 148 and 149 are of opposite hand, and are pitched to have a screw effect on the incoming air somewhat like that of an axial flow propeller. The blades 148 and 149 are disposed with their longitudinal center lines at an acute angle to a plane normal to the axis of the rotor shaft 139 so as also to exert a centrifugal effect on the air which they draw inwardly in the nature of the blades of a sirocco blower, driving the air around the volute portion 132 of the housing and through the tapered transforming portion 136.

A plurality of curved air turning vanes 150 (Figs. 6 and 7) are mounted between upright side plates 151 and 152 centrally of the tapered transformer portion 136 of the housing 131 to direct a central portion of the discharged air upwardly into the upper portions of the foliage when the sprayer is drawn along between rows of trees in an orchard. An outwardly flaring discharge section 33a and laterally shiftable head assembly Da for dividing and diverting selected portions of the air stream are similar to those having similar identifying numbers without the suffix "a," in the form of the invention illustrated in Figs. 1 to 5, inclusive, and described previously herein.

While the upswept rear end of the air blast forming and directing assembly shown in Figs. 1 to 5 is suitable for most orchard and similar uses, it may be desirable in some instances to provide variable directing means for controlling the vertical angle of discharge of the insecticide carrying air blast. In such cases, a modified form of tapered casing section 160 (Fig. 8) may be substituted for the tapered upswept casing section 32 shown in Figs. 1, 2, 3 and 5.

In the tapered casing section 160 (Fig. 8) a plurality of tiltably adjustable vanes 161 are secured to a plurality of vertically spaced horizontal rods 162, mounted for rotative adjustment transversely of the outlet end of the casing section 160 on opposite sides of the vertical rear edges of the core B. The outer ends of the rods 162 are crank shaped and are connected to each other by a vertical bar 163 so that vertical movement of the bar will rotatively move all of the vane supporting rods 162 through similar angles. The angularly adjusted portion of the vanes 161 may be controlled by a link 164 which is connected from the lower end of the bar 163 to one arm of a bell crank lever 165 pivotally mounted on a bearing bracket 167 secured to the outlet end of the tapered casing section 160. The other arm of the bell crank lever 165 is connected to a link 168 which extends forwardly, and may be connected to a suitable control lever, not shown, of a conventional type mounted within reach of the operator.

While I have illustrated and described a preferred embodiment of the present invention and some modifications thereof, it will be understood, however, that various other changes and modifications may be made in the details thereof without departing from the spirit and scope of the invention as set forth in the appended claims.

Having thus described the invention what I claim as new and desire to protect by Letters Patent is as follows:

1. In a spraying and dusting machine having means for creating an air blast, an air blast diverter comprising an air duct connected to said air blast creating means to receive said air blast and to discharge it from an end thereof, an outwardly flaring wall on a side of the discharge end of said air duct, a shiftable head mounted within the duct laterally opposite said flared wall, the side of said head opposite said flared wall being shaped to correspond generally to the shape of said flaring wall, and means connected to the head for shifting said head in translatory movement relative to the flared wall.

2. In an agricultural spraying and dusting machine having means for creating an air blast of large volume and of regular cross sectional shape, an air blast diverter comprising a blast transforming duct associated with said air blast creating means to receive the air blast at one end thereof and to discharge it from the other, the duct being reduced in one transverse dimension and substantially elongated in another normal thereto at its discharge end, an outwardly flaring wall portion on each elongated side of the discharge end of said duct, a shiftable air blast deflector mounted at the discharge end of said duct, said deflector having divergent faces thereof intersecting along an edge which is disposed lengthwise of the elongated dimension of the discharge end of said duct, and means interconnected with the deflector for shifting said deflector to adjusted position between said flaring duct wall portions to define passages of inversely proportional width between said divergent faces of the deflector and said flaring duct walls.

3. In an agricultural spraying and dusting machine having means for creating an air blast of regular cross sectional shape, an air blast diverter comprising a duct associated with said air blast creating means to receive the air blast at one end thereof and to discharge it from the other, diverging wall portions disposed along opposite edges of the discharge end of said duct, a shiftable deflector mounted intermediately of said divergent duct walls and spaced therefrom to provide, with said duct walls, diverging passages having a combined cross sectional area corresponding to that of the discharge end of said duct ahead of said divergent duct wall portions, and means connected to the deflector for translating said deflector toward one of said divergent duct walls and away from the other thereof to vary the sizes of said diverging passages in inverse proportion to each other without substantially changing their combined cross sectional area.

4. In an agricultural spraying and dusting machine having means for creating an air blast, an air blast diverter comprising a duct mounted adjacent the air blast creating means and arranged to receive the air blast at one end thereof and to discharge it from the other, a deflector having opposite faces thereof divergent from each other and positioned in the discharge end of said duct to form with said duct, diverging passages having a combined cross sectional area corresponding to that of said duct ahead of said deflector, and means operably connected to said deflector for shifting said deflector selectively toward and away from a wall of said duct opposite thereto to vary the sizes of said diverging passages in inverse proportion to each other without substantially changing their combined cross sectional area, said shifting means being adapted to shift said deflector to a position closely adjacent either of said walls, thereby to close the passage between the deflector and such adjacent wall.

5. In a spraying and dusting machine having air blast creating means, an air blast diverter comprising a duct positioned adjacent the air blast creating means and arranged to receive the air blast and to discharge it endwise from said duct, a deflecting head mounted in the discharge end of said air duct and means connected to the head for adjusting the same bodily along an arcuate path extending transversely of said duct and curved convexly into the air blast, thereby to deflect selected portions of said air blast toward opposite sides of the duct axis.

6. In an agricultural spraying and dusting machine having an axial flow fan with an imperforate hub portion adapted to create a ring shaped blast of air, an air blast diverter comprising an imperforate core having a rounded end portion thereof mounted concentrically with the downstream end of said hub, said core tapering to an upswept vertical trailing edge, an air duct mounted to enclose said fan and said core and tapered to maintain a substantially constant cross sectional area in the space between the duct and the core, the terminal downstream end portions of said duct side walls being divergent from the duct axis, a deflecting head having diverging side faces intersecting along an edge, means connected to said head for mounting the same with its edge of intersection aligned with the trailing edge of said core, the side faces of said head being disposed to form with said divergent duct wall portions two laterally deflecting air passages of substantially equal cross sectional area, and means connected to said mounting means for shifting said head laterally from said aligned position to vary inversely the cross sectional areas of said passages.

7. In an agricultural spraying machine having means for creating and discharging an air blast, an air blast diverter comprising a duct connected to said air blast creating means to receive the air blast at one end thereof and to discharge it from the other, an upright wall portion on each of two opposite sides of the discharge end of said duct, a fixed core mounted in said duct and terminating between said upright wall portions, a plurality of vanes mounted to extend transversely between a side of said core and one of said upright duct wall portions, means interconnected with said vanes for tilting the same to control vertical deflection of the air blast passing between said core and the latter upright duct wall portion, a shiftable deflector head mounted at the discharge end of said duct, and means connected to said head for shiftably moving the same transversely between said upright duct wall portions to divide and deflect selected portions of the air blast discharged from said duct.

8. In a spraying and dusting machine, in combination, means for creating an air stream, a deflector head having divergent air deflecting faces, and means operatively connected with said head and cooperating with said air stream creating means for moving said head transversely in the air stream to vary inversely the portions of air deflected by each of said faces.

9. In a spraying and dusting machine having means for creating an air blast, an air blast diverter comprising an air duct connected to said air blast creating means to receive said air blast and to discharge it from an end thereof, link means mounted adjacent the discharge end of said duct, an outwardly sloping wall portion on a side of the discharge end of said duct, a shiftable head mounted on said link means for swinging movement therewith, a face of said head being shaped to correspond generally to said wall portion, and means operatively connected with the link means for shifting said head on said link means to vary the spacing of said head face from said duct wall portion.

10. In a spraying and dusting mechanism having a support, an air blast diverter comprising a duct mounted on said support and having a vertical elongated outlet, laterally curved diverging walls on opposite vertical edges of said duct at its outlet, means operatively connected with said duct for directing an air blast through said duct for discharge between said diverging walls, a deflector head having relatively fixed blast deflecting faces mounted to intersect along an upright edge, said faces being curved to correspond substantially to the curvature of said diverging side walls, and means carried by said support for mounting the head between the diverging side walls with its edge of intersection directed into the duct outlet, said mounting means being adjustable whereby said head optionally can be located with its edge of intersection centrally of said outlet and its deflecting faces spaced midway between said diverging side walls, or said head can be moved selectively toward either of said diverging side walls to reduce the space between one deflecting face of said head and one of said curved side walls and simultaneously to increase the space between the other deflecting face of said head and the other of said side walls.

11. In an agricultural spraying and dusting machine, an air blast diverter comprising a duct having outwardly divergent wall portions at an end thereof, means operatively connected with said duct for directing an air stream through said duct for discharge between said divergent wall portions, a deflecting head having deflecting faces mounted to diverge in conformance with said divergent duct wall portions, said head being positioned with the deflecting faces thereof interposed between said diverging duct wall portions and spaced therefrom to form with said duct wall portions laterally divergent passages having a combined cross sectional area substantially equal to that of the duct immediately upstream therefrom.

12. In an agricultural spraying and dusting machine, an air blast diverter comprising a duct having outwardly divergent wall portions at an end thereof, means operatively connected with said duct for directing an air stream through said duct for discharge between said divergent wall portions, a deflecting head having deflecting faces mounted to diverge in conformance with said duct wall portions, said head being interposed between said duct wall portions and spaced therefrom to form, with said duct wall portions, laterally divergent passages, and means connected to said head for translating the same transversely of the duct to vary, inversely, the width of said passages.

13. In a spraying and dusting mechanism, a support, air stream creating means thereon, an air blast diverter comprising a duct mounted on said support, said air stream creating means being connected to said duct for directing the air stream through said duct for discharge endwise therefrom, a deflector head having divergent deflecting faces thereon, means connected to said head and supporting the same for lateral and coordinated longitudinal movement at the discharge end of said duct with the apex of the angle of divergence of said head faces directed into the discharge end of said duct, and control means operatively connected with said head and so constructed as to move the same to laterally and corrdinated longitudinally adjusted position at the discharge end of said duct and to maintain the apex of the angle of divergence of said head faces directed into the discharge end of said duct to divide the air stream discharged therefrom into selected portions and to deflect said portions laterally toward opposite sides of said duct.

14. In a spraying and dusting mechanism, a support, means thereon for creating an air stream, an air blast diverter comprising a duct mounted on said support, means connecting the air stream creating means to the duct for directing the air stream through said duct for discharge endwise therefrom, laterally diverging wall portions formed on opposite sides of said duct at its discharge end, a deflector head having deflecting faces thereon diverging at an angle corresponding to the angle of divergence of the duct wall portions, means on said support for mounting said head at the discharge end of said duct with said deflecting faces interiorly opposite said diverging duct wall portions, positioning means connected to said mounting means for moving said head along an arcuate path extending transversely of said duct and for maintaining the deflecting head faces against angular displacement relatively to said diverging wall portions during such movement.

15. In a spraying and dusting mechanism, a support, means thereon for creating an air stream, an air blast diverter comprising a duct mounted on said support, means connecting the air stream creating means to the duct for directing the air stream through said duct for discharge endwise therefrom, a deflector head having deflecting faces thereon, a pair of parallel links pivotally mounted on said support and pivotally connected to said head to mount said head with said deflecting faces adjacent the discharge end of said duct, and means connected to said links to swing said links and move said head to laterally and coordinated longitudinally adjusted position at the discharge end of said duct to divide the air stream discharged therefrom into selected portions and to deflect said portions laterally toward opposite sides of said duct.

16. In an agricultural spraying and dusting machine having an axial flow fan with an imperforate hub portion adapted to create a ring shaped blast of air, an air blast diverter comprising an imperforate core mounted adjacent said hub and having an annular end portion thereof concentric with the downstream end of said hub, said core tapering to a vertical trailing edge, an air duct mounted to enclose said fan and said core and tapered to maintain a substantially constant cross sectional area in the space between the duct and the core, a deflecting head having diverging side faces intersecting along an edge, means attached to the head for supporting the same with its edge of intersection aligned with the trailing edge of said core, and means operatively connected with said head for adjusting the same laterally from said aligned position to divide and deflect selected portions of the air discharged from said duct.

17. In a spraying and dusting machine having means for creating an air blast of annular cross sectional shape, an air blast diverter comprising a tapered duct connected to said air blast creating means to reecive the air blast, conduct it axially thereof, and discharge it endwise therefrom, a core in said duct, said core being tapered to maintain a substantially constant cross sectional area between the core and the duct, laterally diverging duct wall portions disposed along opposite edges of the discharge end of said duct and co-extensive therewith, a deflecting head having diverging faces thereon, means connected to said head for supporting the same for movement along a curved path transversely of the discharge end of said duct with each of said diverging head faces mounted opposite a diverging wall portion of said duct, and means operatively connected with said supporting means for moving said head along its curved path to vary the separation between the diverging faces of the head and the diverging duct wall portions respectively opposite thereto.

18. In an agricultural spraying machine having means for creating and discharging an air blast, an air blast diverter comprising a duct operatively connected with said air blast creating means in position to receive the air blast at one end of said duct and to discharge said air blast from the other, an upright wall portion on each of two opposite sides of the discharge end of said duct, a plurality of vanes mounted to extend transversely between said upright duct wall portions, means operatively connected to said vanes for tilting the vanes to control vertical deflection of the air blast passing between said upright duct wall portions, a shiftable deflector head mounted at the discharge end of said duct, and means operatively connected with said head for moving the same transversely between said upright wall portions to select the quantity of the air blast discharged from said duct to be deflected on each side of said deflector.

References Cited in the file of this patent

UNITED STATES PATENTS

| 449,743 | Landis | Apr. 7, 1891 |
| 1,862,396 | Gray | June 7, 1932 |
| 2,144,035 | Smith | Jan. 17, 1939 |
| 2,220,082 | Daugherty | Nov. 5, 1940 |
| 2,310,895 | Brown | Feb. 9, 1943 |
| 2,331,107 | Daugherty | Oct. 5, 1943 |
| 2,358,318 | Daugherty | Sept. 19, 1944 |
| 2,387,348 | Place | Oct. 23, 1945 |
| 2,423,008 | Daugherty | June 24, 1947 |
| 3,476,960 | Daugherty | July 26, 1949 |
| 2,547,927 | Daugherty | Apr. 10, 1951 |
| 2,554,633 | Orear | May 29, 1951 |